May 25, 1971     P. W. RANBY     3,580,738
PLASTICS MATERIALS WITH CONDUCTIVE SURFACES
Original Filed Dec. 3, 1965
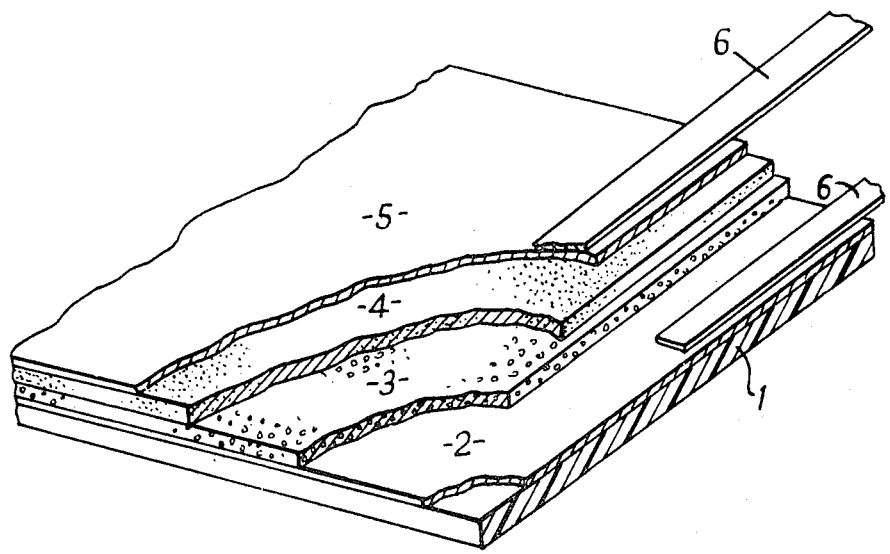
PETER WHITTEN RANBY
JOHN LENARD NORTHWOOD
INVENTOR United States Patent Office 3,580,738
Patented May 25, 1971

3,580,738
PLASTICS MATERIALS WITH CONDUCTIVE SURFACES
Peter Whitten Ranby and John Lenard Northwood, London, England, assignors to Thorn Electrical Industries Limited, London, England
Continuation of abandoned application Ser. No. 511,428, Dec. 3, 1965. This application Feb. 16, 1970, Ser. No. 10,094
Claims priority, application England, Dec. 4, 1964, 49,510/64
Int. Cl. B44d 1/14, 1/18
U.S. Cl. 117—215
4 Claims

ABSTRACT OF THE DISCLOSURE

A method of making light transmitting plastics electrically conductive including depositing a layer of indium metal upon the plastic, heating the layer and then washing it with an acid.

---

This application is a continuation of our copending application, Ser. No. 511,482, filed Dec. 3, 1965, now abandoned.

The present invention relates to a process for making the surface of a light-transmitting plastics material electrically conductive, and to the application of this process and product in manufacture of electroluminescent lamps.

Light-transmitting electrically conductive glass in an important material in the fabrication of electroluminescent lamps, because it can serve as one electrode in the construction and at the same time enables light to be emitted from the lamp. Electroluminescent lamps can be prepared using a transparent plastics material in place of electrically conductive glass, provided that the plastics material can be made sufficiently conductive to electricity, without at the same time causing it to absorb too much light. The advantage of using a transparent electrically conductive plastics material in place of glass in an electroluminescent lamp is that the lamp can be made in a flexible form, and is much lighter in weight and resistant to breakage by impact.

The surface of a light-transmitting plastics material can be rendered conductive by applying to it a thin coating of aluminium, but this reduces the light transmission of the material to a level which is not acceptable for use in an electroluminescent lamp.

It is an object of the present invention to provide a process whereby the surface of a light-transmitting plastics material is rendered electrically conductive without a large reduction in the light transmission of the material.

It is a further object of the invention to provide a more economical method for the production of a plastic electroluminescent lamp, in which the procedure is simplified by the employment of a plastic film having a light-transmitting conductive surface.

According to the invention the surface of a light-transmitting plastics material is provided with a thin coating of indium metal, and the coating is heated until an electrically conductive light-transmitting surface layer is formed. Surprisingly, in view of the poor light-transmission obtained with conductive films of other metals, a conductive layer can be obtained which has an acceptably high transmission in the visible regions of the spectrum. The weight of indium applied should lie within the range of 0.0002 to 0.005 gram per square inch of surface, and is preferably between 0.00025 and 0.004 gram per square inch. Although a vacuum evaporation technique is preferred for the application of the thin coating of indium, it is also possible to employ other techniques such as sputtering.

Moreover, it has been found that if this surface layer is washed with acid the light transmission characteristics can be improved. Acids which give this result are in general those which attack indium or indium oxide, and include not only mineral acids but also organic acids such as acetic and formic acids. Mineral acids such as nitric acid are preferred, as they require a much shorter time of treatment or much lower concentration than the organic acids mentioned above to obtain the desired increase in light transmission. Thus 25% acetic acid is required to give results comparable to 2% nitric acid in the same time.

Light-transmitting electrically conductive coatings have been successfully applied to a number of light-transmitting plastics materials which are stable to temperatures of at least 150° C.

The technique of forming thin evaporated layers of metals on plastics materials by vacuum evaporation is well known. Gold films for example, evaporated on to the surface of plastics material can have resistivities of the order of 100 ohms per square, but the surface coating absorbs light.

In practice, the resistivity of the conductive light-transmitting surface prepared according to the invention for use in an electroluminescent lamp construction can be of the order of a few thousand ohms down to a hundred or so ohms per square. In practice the lower values are preferred.

In producing a plastic electroluminescent device according to the invention, the principal steps include forming a conductive layer on the surface of a transparent plastic material, applying a layer of electroluminescent phosphor in an organic binder, and applying a back electrode, for example of vaporized metal or conductive paint. A layer of a high dielectric constant material in an organic binder is preferably interposed between the phosphor layer and the back electrode.

Provision is made for making electrical contact with the two electrodes, and the lamp is usually encapsulated in a further transparent plastic envelope to exclude moisture.

It has previously been proposed to apply a vaporized gold film to a phosphor-dielectric matrix to form thereon an electrically conductive light-transmitting layer to serve as one electrode of an electroluminescent lamp. In employing this technique, the gold layer is laid down at a late stage in the production of the lamp, the layers of which are built up on a solid back electrode in the reverse order from that of the invention. In another prior art construction a transparent electrode is provided in the form of a conductive glass paper, which is brittle and difficult to handle. By reason of the fragility of this glass conductive paper, this process requires a rigid backing on which the structure of the lamp can be built up, in contrast to the method according to the invention.

Electroluminescent lamps according to the invention can be made thinner and more flexible than prior plastic lamps, especially where an evaporated metal or conductive paint back electrode is employed. There is no necessity for the solid or rigid backing electrode as required by the prior processes, and the conductive plastic base employed makes the structure robust and easy to handle at all stages of lamp production.

One form of electroluminescent device embodying the invention, together with a method by which it can be fabricated, will now be described with reference to the accompanying drawing, which is a cut-away perspective diagram of a fragment of the device, the thickness of the different layers not being to scale.

In the device, a transparent plastic sheet 1, for example a polyester film or a polymethacrylate plate, is provided with a light-transmitting conductive surface layer or film 2 of indium. A layer 3 of electroluminescent phosphor, for example a zinc sulphide phosphor, in an organic binder is superimposed on the conductive surface and is in turn covered by dielectric layer 4, for example of barium titanate or barium strontium titanate in an organic binder. A flexible back electrode coating 5, for example of evaporated metal such as aluminium, or a conductive paint, covers the dielectric layer. Electrical connectors 6, for example in the form of strips of copper foil, are provided to make contact respectively with the electrodes 2 and 5. The device is preferably encapsulated in a transparent plastic envelope, which is not shown in the drawing in order that the layer structure of the device itself should not be obscured.

Among the organic substances suitable as binders for the phosphor and the dielectric are, for example, cellulose nitrate and acetate, vinylidene and vinyl chloride polymers and copolymers, polyacrylates and polymethacrylates, and alkyd and epoxy resins, with which plasticisers may be incorporated. The preferred binder is cyanoethylcellulose.

Suitable materials for the encapsulating envelope include, for example, polyethylene, polytetrafluoroethylene, polychlorotrifluoroethylene, polystyrene and polymethacrylate, vinylidene and vinyl chloride and fluoride polymers.

The following are examples of the process production of a conductive layer according to the present invention.

EXAMPLE 1

A piece of clear transparent "Melinex" polyester foil 0.003 inch thick, 1½ inches wide and 12 inches long is washed with an aqueous detergent, rinsed with water, and then immersed in a chromic acid solution for 10 minutes, rinsed with water and wiped dry. (The word "Melinex" is a trademark of Imperial Chemical Industries Ltd.)

The "Melinex" strip is formed into a cylinder round the tungsten filament of a conventional vacuum evaporation unit. 10 milligrams of indium foil are placed on the filament, the evaporation chamber is evacuated to a pressure of 0.1 micron of mercury and the indium evaporated in the normal manner.

After removal from the evaporation unit, the "Melinex" strip has a surface conducting layer with a resistance of 150 to 300 ohms per square but does not transmit light. The strip is then placed in an air oven and the temperature is raised over a period of five minutes to 160° C. and then maintained at this value for a further ten minutes. When cool, it is found that the surface is conducting with a resistance of 150 to 300 ohms per square but the strip is no longer opaque to light, having instead a transmission of 60%, as compared with the transmission of the untreated foil.

The transmission can be increased still further by immersing the coated "Melinex" in 2% nitric acid solution and then rinsing with water and wiping dry. If the immersion in nitric acid is continued for 2 minutes the transmission is 62% and the resistance of the film is 450 ohms per square, while after 5 minutes immersion the transmission has increased to 85% and the resistance of the film is 5,000 ohms per square.

EXAMPLE 2

A piece of colourless transparent "Perspex" polymethylmethacrylate sheet 1/16 inch thick and 2 x 2 inches square is treated as in Example 1. (The word "Perspex" is a trademark of Imperial Chemical Industries Ltd.) The coating of the "Perspex" in the evaporation unit is carried out by placing the "Perspex" horizontally over the filament and which in this case has 35 milligrams of indium foil placed on the filament. The remainder of the treatment is as described in Example 1, and similar results are obtained.

In one example of the production of a flexible electroluminescent device according to the invention, 0.003 inch "Melinex" polyester film is provided with a conductive layer as described in Example 1. A copper strip connector is laid in place and the film is coated on its conductive surface with a dispersion in cyanoethylcellulose of a green zinc sulphide electroluminescent phosphor activated with copper and chloride ions, for example by doctor blade coating or spraying with a dispersion of the phosphor in a 10% solution of cyanoethylcellulose in 1:1 acetone and dimethylformamide and subsequently drying. Thereafter a high dielectric layer may be applied in the form of a dispersion of barium strontium titanate prepared and applied in a similar manner. Finally, a layer of vaporized aluminium or an electrically conducting paint is applied to form the back electrode, which may be opaque, a copper strip connector being also placed in contact with this electrode.

In most cases it will be preferable to encapsulate the device, for example by enclosing it between two sheets of transparent plastic, such as 0.015 inch polyethylene or 0.005 inch chlorotrifluoroethylene polymer film, which are then heat sealed together in known manner round their edges with the copper strip connectors protruding.

The resulting lamp has green luminescence, with a brightness of 8 foot lamberts as viewed through the conductive "Melinex" film, when the connectors are connected to a 230 volt, 50 c.p.s. supply. This value demonstrates the high light transmission of the conductive film according to the invention.

In another test, three experimental green electroluminescent lamps were prepared using a zinc sulphide phosphor activated with copper and chloride ions and the following materials as light-transmitting electrodes:

(a) conducting plastic film according to the invention, having a resistance of 150 ohms per square;
(b) an evaporated aluminium film having a resistance of 80 ohms per square; and
(c) an evaporated gold film having a resistance of 120 ohms per square.

The lamps were operated at 230 volts, 50 cycles and the following brightness values were observed:

(a) 6.15 foot lamberts
(b) 1.2 foot lamberts
(c) 2.0 foot lamberts

It will be apparent that other materials and techniques may be substituted for those referred to in the foregoing description of the production of an electroluminescent device. For example, other phosphors, such as zinc selenide or zinc cadmium sulphide, and other conductive plastics, binders and encapsulating materials including those listed above, may be employed. All such variations are contemplated as may fall within the spirit and scope of the invention as defined in the appended claims.

What is claimed is:

1. In the process of forming an electroluminescent lamp, the steps which comprise: forming a layer of indium metal upon a transparent plastic, said layer having a coating weight between about 0.0002 to 0.005 gram per square inch; heating said layer in air to a temperature of about 160° C. until it becomes electrically conductive and light transmitting; washing said layer with either nitric, formic or acetic acids; coating said indium layer with an electroluminescent phosphor dispersed in an organic binder and then disposing an electrically conductive layer over said phosphor coating to serve as a second electrode.

2. A process according to claim 1 in which said coating is formed by vacuum evaporation in indium metal.

3. A process according to claim 1 in which said plastics material is a film-forming polyester or polymethacrylate.

4. A process according to claim 1 including the further step of coating said phosphor coating with a material of high dielectric constant dispersed in an organic binder before said second electrode layer is applied.

References Cited

UNITED STATES PATENTS

| | | |
|---|---|---|
| 2,894,854 | 7/1959 | MacIntyre, Jr., et al. |
| 2,932,590 | 4/1960 | Barrett et al. |
| 3,074,816 | 1/1963 | Blazek. |
| 3,356,529 | 12/1967 | Kiser et al. |

ALFRED L. LEAVITT, Primary Examiner

C. K. WEIFFENBACH, Assistant Examiner

U.S. Cl. X.R.

117—33.5, 106, 211, 218; 148—6.3